US012592443B2

(12) United States Patent
Morioka et al.

(10) Patent No.: US 12,592,443 B2
(45) Date of Patent: Mar. 31, 2026

(54) PLATE FOR BATTERY STACK AND BATTERY STACK

(71) Applicants: Yazaki Corporation, Tokyo (JP); TOYOTA JIDOSHA KABUSHIKI KAISHA, Aichi-ken (JP); KABUSHIKI KAISHA TOYOTA JIDOSHOKKI, Aichi-ken (JP)

(72) Inventors: Satoshi Morioka, Okazaki (JP); Motoyoshi Okumura, Nagoya (JP); Hiromi Ueda, Kariya (JP); Naoto Morisaku, Kariya (JP); Ryuta Takishita, Kakegawa (JP); Yutaro Okazaki, Kakegawa (JP); Shinichi Yanagihara, Kakegawa (JP)

(73) Assignees: YAZAKI CORPORATION, Minato-ku (JP); TOYOTA JIDOSHA KABUSHIKI KAISHA, Toyota (JP); KABUSHIKI KAISHA TOYOTA JIDOSHOKKI, Kariya (JP)

( * ) Notice: Subject to any disclaimer, the term of this patent is extended or adjusted under 35 U.S.C. 154(b) by 664 days.

(21) Appl. No.: 17/733,098

(22) Filed: Apr. 29, 2022

(65) Prior Publication Data

US 2022/0352578 A1     Nov. 3, 2022

(30) Foreign Application Priority Data

Apr. 30, 2021     (JP) ................................. 2021-078145

(51) Int. Cl.
*H01M 50/289*     (2021.01)
*H01M 10/48*     (2006.01)
(Continued)

(52) U.S. Cl.
CPC ....... *H01M 50/289* (2021.01); *H01M 10/486* (2013.01); *H01M 50/209* (2021.01); *H01M 50/291* (2021.01); *H01M 50/293* (2021.01)

(58) Field of Classification Search
CPC ..................................................... Y02E 60/10
See application file for complete search history.

(56) References Cited

U.S. PATENT DOCUMENTS

2015/0037661 A1*  2/2015  Lee ...................... H01M 50/211
                                                                      429/163
2016/0359206 A1*  12/2016  Eberleh ............... H01M 10/613
(Continued)

FOREIGN PATENT DOCUMENTS

JP           2020-161460 A      10/2020
JP           2020198211 A       12/2020
WO      WO-2021018887 A1 *   2/2021   ........ H01M 10/0431

*Primary Examiner* — Tiffany Legette
*Assistant Examiner* — Christine Disney
(74) *Attorney, Agent, or Firm* — Sughrue Mion, PLLC

(57)     ABSTRACT

There are provided a plate for a buttery stack and battery stack including: a plate-shaped housing having a fitting groove provided in a recessed shape in a first plate side surface of the plate for the battery stack along a longitudinal direction thereof; a plurality of bottomed first recessed holes formed side by side in a direction orthogonal to a plate thickness direction of the plate for the battery stack, and extending from a second plate side surface opposite to the first plate side surface; and a plurality of second recessed holes formed side by side in the direction orthogonal to the plate thickness direction, and extending from a bottom portion of the fitting groove to be positioned between the two adjacent first recessed holes.

4 Claims, 10 Drawing Sheets

(51) Int. Cl.
    *H01M 50/209*     (2021.01)
    *H01M 50/291*     (2021.01)
    *H01M 50/293*     (2021.01)

(56)           References Cited

U.S. PATENT DOCUMENTS

2017/0331079 A1   11/2017  Yu et al.
2020/0358145 A1*  11/2020  Sauerteig .......... H01M 10/0585
2022/0216562 A1*   7/2022  Heldmaier .......... H01M 50/242

* cited by examiner

PLATE FOR BATTERY STACK AND BATTERY STACK

This application is based on and claims priority under 35 USC 119 from Japanese Patent Application No. 2021-078145 filed on Apr. 30, 2021, the contents of which are incorporated herein by reference.

TECHNICAL FIELD

The present disclosure relates to a plate for a battery stack and a battery stack including the plate for the battery stack.

BACKGROUND ART

Various power storage devices have been proposed in related-art, and for example, a power storage device disclosed in JP2020-198211A includes a plurality of stacked power storage modules and a plurality of plate-shaped members disposed between the power storage modules.

The plurality of power storage modules and the plurality of plate-shaped members are disposed between a pair of insulating plates, and a restraining force is applied thereto by a restraining tool, thereby constituting a stacked body (battery stack) formed in a substantially rectangular parallelepiped shape.

The power storage module includes a resin frame, a plurality of battery cells, and a plurality of current collector plates. The plate-shaped member includes a conductive portion (conductive plate) that electrically connects adjacent power storage modules to each other, and an insulating portion (plate for battery stack) disposed on an outer periphery of the plate-shaped member. Since the insulating portion of the plate-shaped member is located on an outer peripheral surface of the power storage device, an amount of exposure of the conductive portion from the outer peripheral surface of the energy storage device can be reduced.

The insulating portion of the plate-shaped member sandwiched between the plurality of stacked power storage modules as described above is formed by injection molding of, for example, an insulating resin material into a rectangular flat plate shape having a predetermined plate thickness in order to maintain the plurality of power storage modules at a predetermined interval. However, when a thickness of the flat plate-shaped insulating portion is large, molding defects such as sink marks and warpage may occur during injection molding.

Therefore, it is conceivable to provide a plurality of recessed portions on plate surfaces (front and back surfaces) of the flat plate-shaped insulating portion to reduce the thickness while ensuring a compressive strength in a plate thickness direction and an apparent plate thickness, thereby preventing molding defects such as sink marks and warpage. However, in a case where a plurality of recessed portions are provided on a plate surface of the insulating portion that is a stacked surface, unevenness due to the plurality of recessed portions is formed on the plate surface of the insulating portion. Therefore, when a restraining force is applied to the insulating portion of the plate-shaped member provided with the plurality of recessed portions by a restraining tool for constituting a stacked body, sandwiched surfaces of the power storage modules may be damaged or the stacked surfaces may be lifted due to inclination.

SUMMARY OF INVENTION

The present disclosure provides a plate for a battery stack, which can be favorably sandwiched between a plurality of stacked power storage modules, and a battery stack.

According to an illustrative aspect of the present disclosure, a plate for a battery stack configured to be sandwiched between a plurality of power storage modules, includes: a plate-shaped housing having a fitting groove provided in a recessed shape in a first plate side surface of the plate for the battery stack along a longitudinal direction thereof, the fitting groove being a groove configured to fit with a side edge portion of a conductive plate disposed between the plurality of stacked power storage modules; a plurality of bottomed first recessed holes formed side by side in a direction orthogonal to a plate thickness direction of the plate for the battery stack, and extending from a second plate side surface opposite to the first plate side surface; and a plurality of second recessed holes formed side by side in the direction orthogonal to the plate thickness direction, and extending from a bottom portion of the fitting groove to be positioned between the two adjacent first recessed holes.

The present disclosure has been briefly described as above. Further, details of the present disclosure will be further clarified by reading through an embodiment described below (hereinafter referred to as the "embodiment") with reference to the accompanying drawings.

DESCRIPTION OF EMBODIMENT

Hereinafter, an example of an embodiment according to the present disclosure will be described with reference to the drawings.

Figure 1:
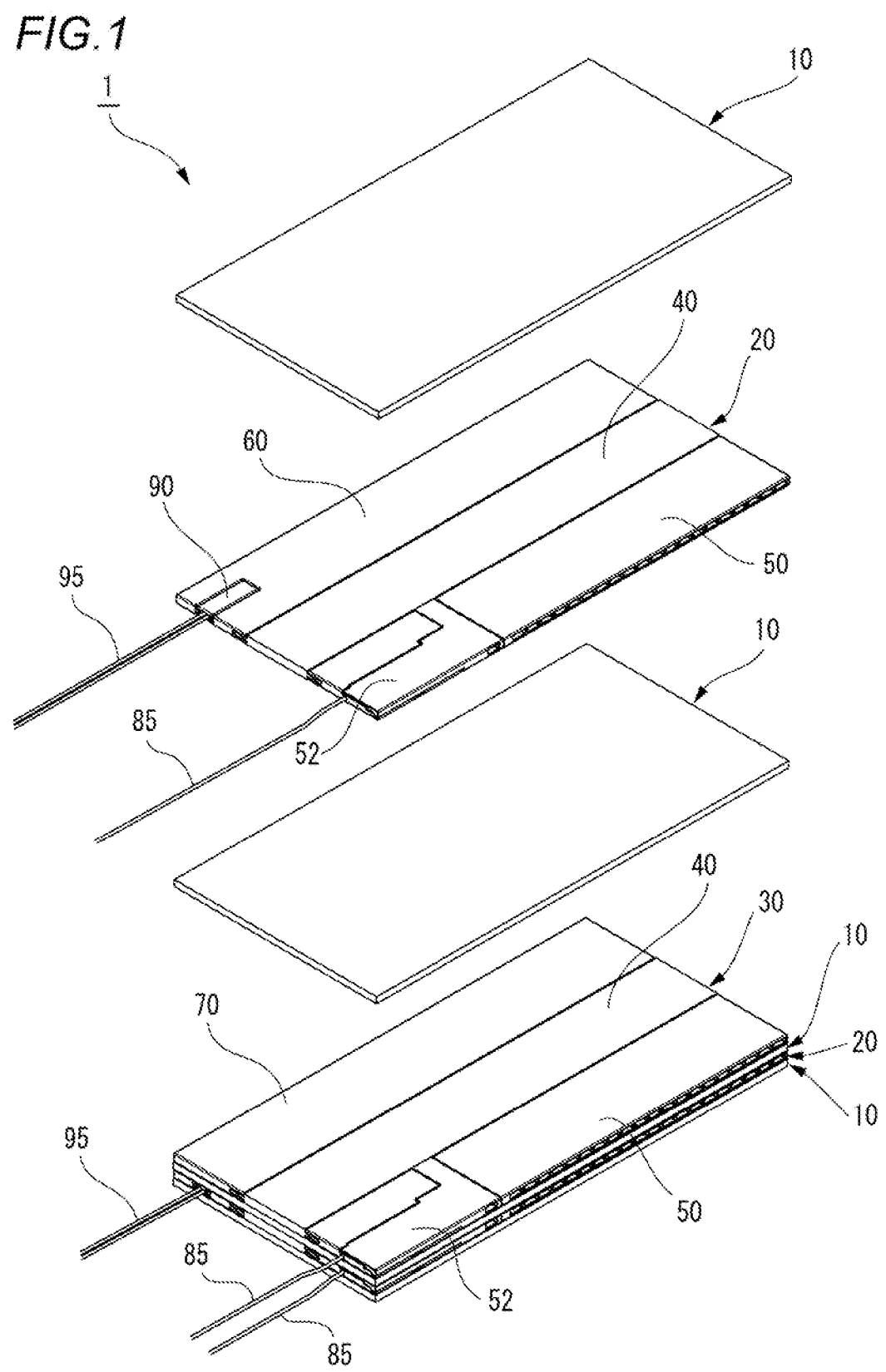
FIG. 1 is an exploded perspective view of a main part of a battery stack according to an embodiment of the present disclosure.
Figures 2A, 2B:
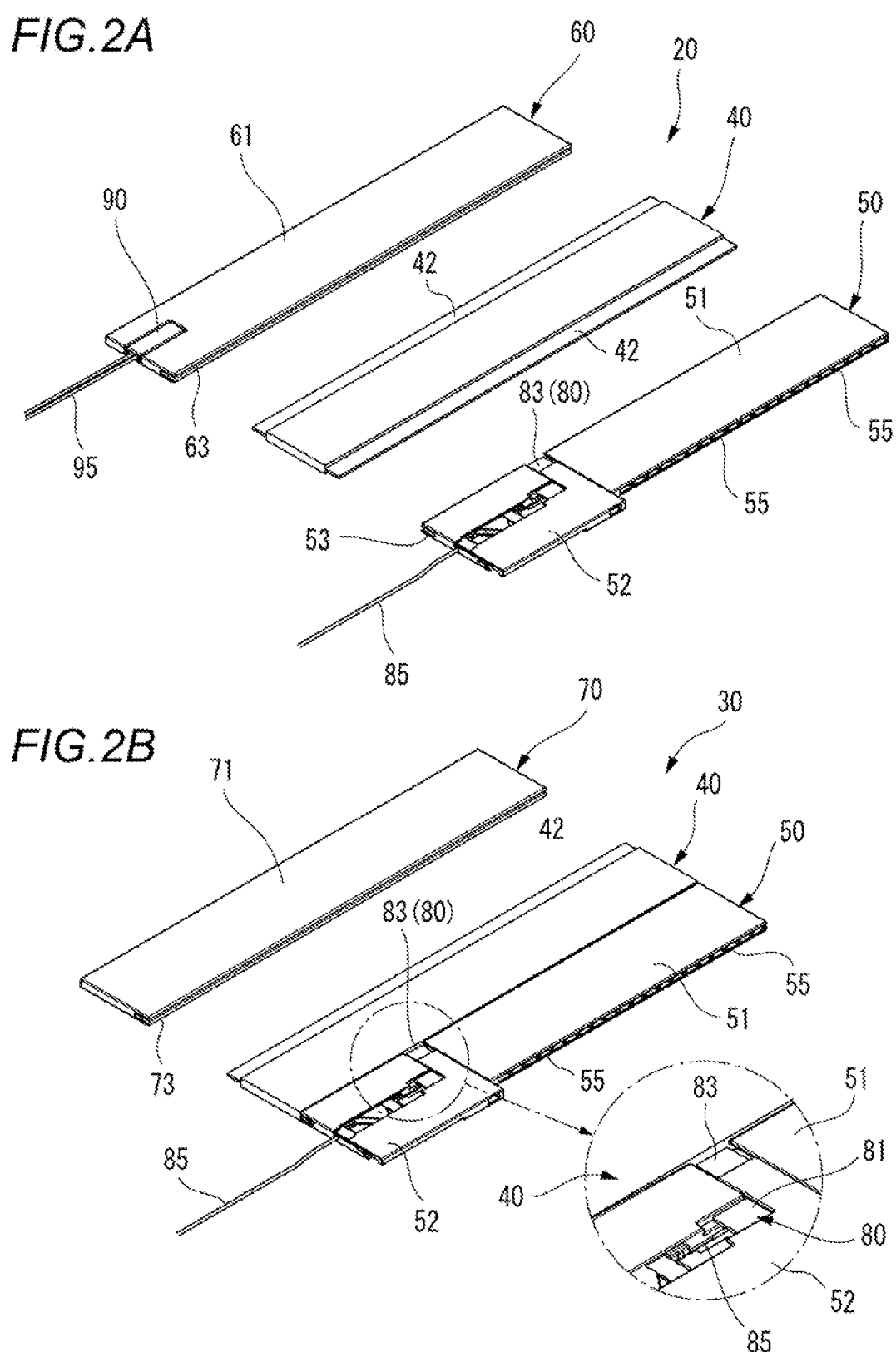
FIG. 2A is an exploded perspective view of a first plate-shaped member shown in FIG. 1.
FIG. 2B is an exploded perspective view of a second plate-shaped member shown in FIG. 1.

FIG. 1 is an exploded perspective view of a main part of a battery stack 1 according to the embodiment of the present disclosure. FIG. 2A is an exploded perspective view of a first plate-shaped member 20 shown in FIG. 1, and FIG. 2B is an exploded perspective view of a second plate-shaped member 30 shown in FIG. 1.

As shown in FIG. 1, the battery stack 1 according to the present embodiment includes a plurality of (four in the present embodiment) stacked power storage modules 10, and first and second plate-shaped members (plate-shaped members) 20, 30 respectively disposed between the plurality of power storage modules 10. The battery stack 1 is disposed between a pair of insulating plates (not shown) and is formed in a substantially rectangular parallelepiped shape by a restraining tool (not shown).

The power storage module 10 is formed in a rectangular fat plate shape including, for example, a plurality of battery cells, a plurality of current collector plates, and a resin frame. The battery cell includes a positive electrode mixture layer formed of nickel hydroxide or the like, a negative electrode mixture layer formed of a hydrogen adsorption alloy or the like, a separator formed of a porous film formed of a polyolefin-based resin or the like, and an electrolytic solution.

It is needless to say that the power storage module 10 can be configured by a single battery cell, and a configuration of the battery cell is not limited to the above-described configuration, and various known battery configurations can be adopted.

As shown in FIGS. 1, 2A and 2B, the first plate-shaped member 20 according to the present embodiment is formed in a rectangular flat plate shape including a conductive plate 40, and a plate 50 for the battery stack and a plate 60 for the battery stack respectively fitted to both side edge portions 42 of the conductive plate 40.

The second plate-shaped member 30 is formed in a rectangular flat plate shape including the conductive plate 40, and the plate 50 for the battery stack and a plate 70 for the battery stack respectively fitted to both side edge portions 42 of the conductive plate 40.

The conductive plate 40 is formed in an elongated rectangular plate shape by a metal such as an aluminum alloy or copper, and both side edge portions 42 in a longitudinal direction are formed in a convex piece shape having a thin plate thickness. Both side edge portions 42 of the conductive plate 40 are respectively fitted into a fitting groove 53 of the plate 50 for the battery stack, and each of fitting grooves 63, 73 of the plates 60, 70 for the battery stack.

The conductive plate 40 is a conductive portion that electrically connects the adjacent power storage modules 10 to each other, and also serves as a heat sink that cools the adjacent power storage modules 10.

Figure 3:
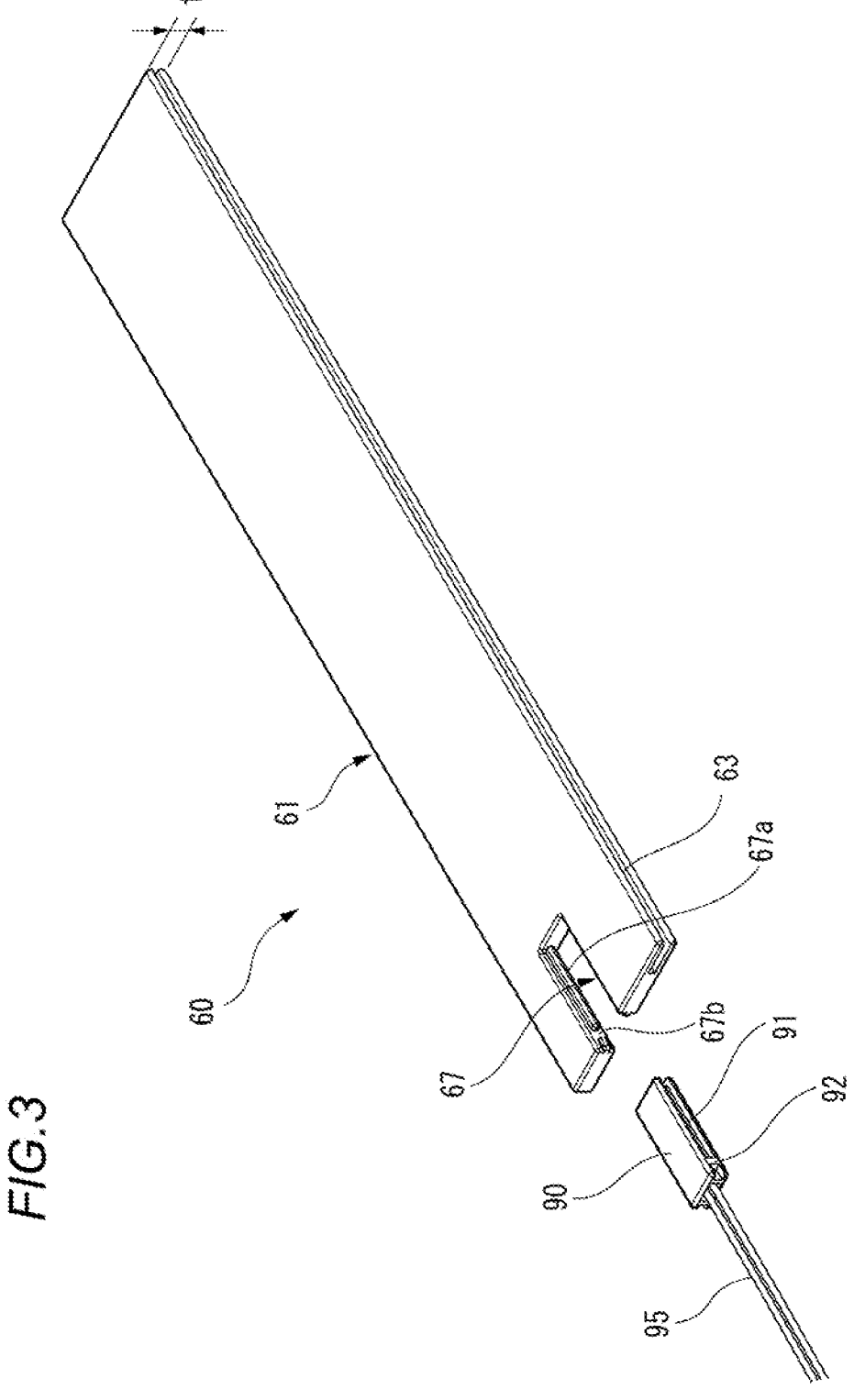
FIG. 3 is an exploded perspective view of a plate for the battery stack including a battery temperature sensor shown in FIG. 2A.
Figure 4:
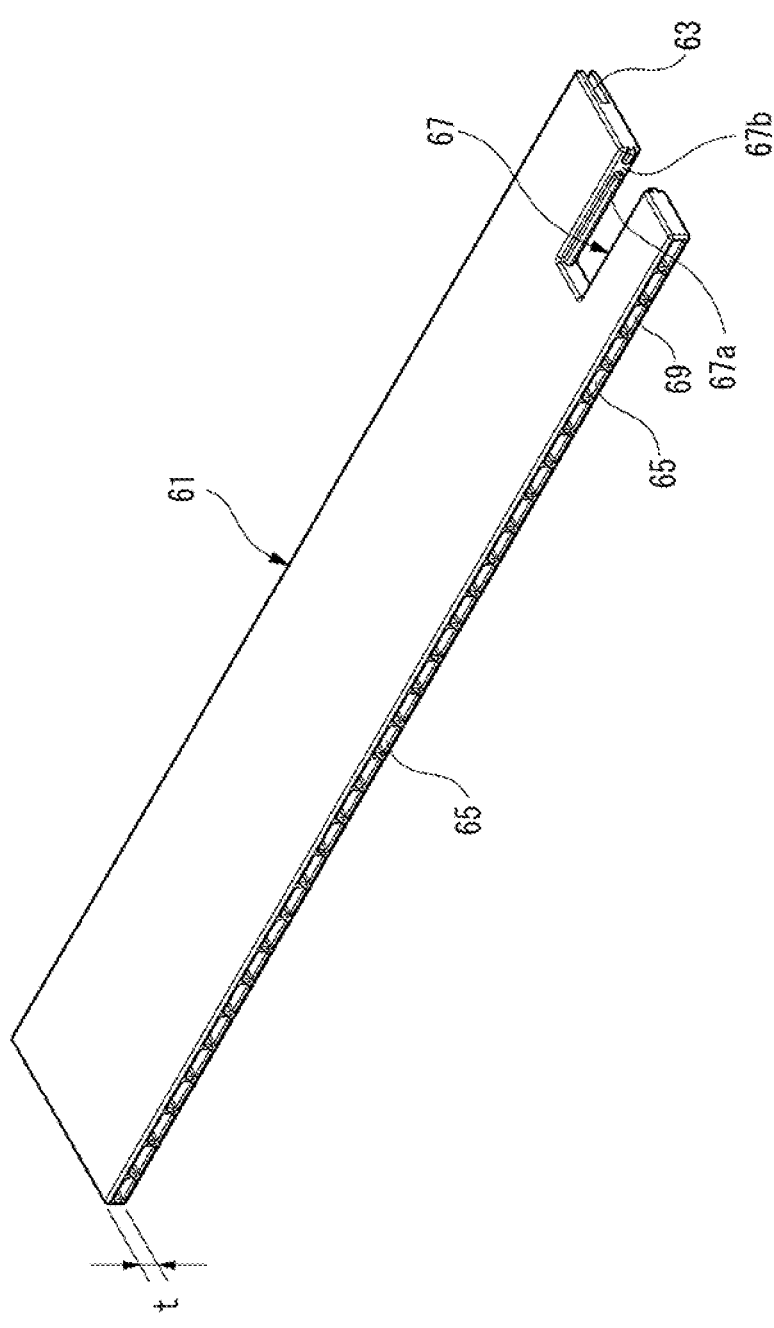
FIG. 4 is a perspective view seen from an opposite side of a housing shown in FIG. 3.
Figure 5:
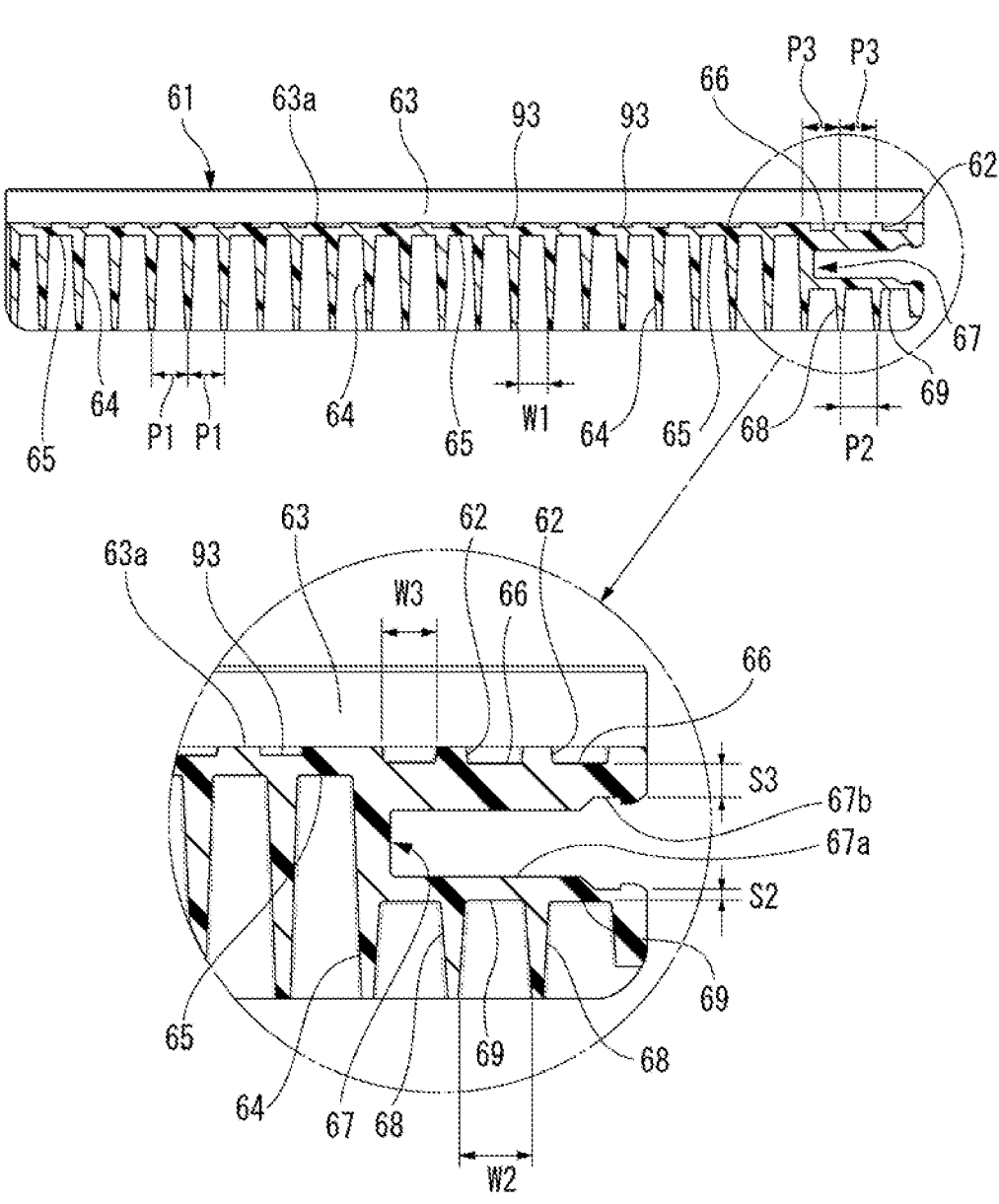
FIG. 5 is a horizontal sectional view and an enlarged view of a main part of the housing shown in FIG. 3.

FIG. 3 is an exploded perspective view of the plate 60 for the battery stack including a battery temperature sensor 90 shown in FIG. 2A. FIG. 4 is a perspective view seen from an opposite side of a housing 61 shown in FIG. 3. FIG. 5 is a horizontal sectional view and an enlarged view of a main part of the housing 61 shown in FIG. 3.

As shown in FIG. 3, the plate 60 for the battery stack according to the present embodiment is configured to include the elongated rectangular plate-shaped housing 61, the battery temperature sensor 90, and an electric wire 95 whose one terminal is connected to the battery temperature sensor 90.

The battery temperature sensor 90 is attached to the housing 61 and is interposed between plate surfaces of the power storage modules 10 adjacent to each other, thereby detecting temperatures of the energy storage modules 10. The other terminal of the electric wire 95 whose one terminal is connected to the battery temperature sensor 90, is electrically connected to a temperature detection circuit (not shown) via a connector or the like.

The housing 61 is formed by injection molding of an insulating resin material into an elongated rectangular plate shape having a predetermined plate thickness t.

As shown in FIG. 3, a fitting groove 63 for fitting to the side edge portion 42 of the conductive plate 40 is recessed in one plate side surface along a longitudinal direction, which is a first plate side surface of the housing 61. A surface of a plate surface of the housing 61 in which the fitting groove 63 is fitted to the side edge portion 42 of the conductive plate 40 is configured to be flush with a surface of a plate surface of the conductive plate 40.

As shown in FIG. 5, on the other plate side surface along the longitudinal direction, which is a second plate side surface of the housing 61 opposite to the first plate side surface, a plurality of first recessed holes 65 are formed side by side in a direction (upward direction in FIG. 5) orthogonal to a plate thickness direction from the second plate side surface. The plurality of first recessed holes 65 are bottomed holes each having an opening width W1 in an arrangement direction and formed in a substantially rectangular parallelepiped shape so as to be arranged side by side at predetermined intervals on the second plate side surface. Therefore, ribs 64 having a predetermined pitch P1 are formed between the plurality of first recessed holes 65. Here, the recessed holes may be referred to as thickness reduction holes.

Further, as shown in FIG. 5, in a bottom portion 63a of the fitting groove 63 respectively corresponding to between the two adjacent first recessed holes 65, 65, a plurality of bottomed second recessed holes 93 are formed side by side in a direction (downward direction in FIG. 5) orthogonal to the plate thickness direction from the bottom portion 63a of the fitting groove 63.

As shown in FIG. 3, a sensor accommodating portion 67 for accommodating the battery temperature sensor 9) is recessed in a third plate side surface on one end portion side (right end portion side in FIG. 5) in the longitudinal direction intersecting with the first plate side surface of the housing 61. The sensor accommodating portion 67 is a recess formed by cutting out so as to penetrate from the third plate side surface of the housing 61 in the plate thickness direction.

In the battery temperature sensor 90, guide grooves 91 formed on both side surfaces are inserted and guided by guide ribs 67a protruding from both side walls of the sensor accommodating portion 67. Then, a locking protrusion 92 is locked to a locking recess 67b, so that the battery temperature sensor 90 is held in the sensor accommodating portion 67.

Further, on the second plate side surface on the one end portion side (right end portion side in FIG. 5) in the longitudinal direction of the housing 61, a plurality of third recessed holes 69 are formed side by side in a direction orthogonal to the plate thickness direction from the second plate side surface so as to correspond to the sensor accommodating portion 67. The third recessed holes 69 are bottomed holes each having an opening width W2 in an arrangement direction and formed in a substantially rectangular parallelepiped shape so as to be arranged side by side at predetermined intervals on the second plate side surface. Therefore, ribs 68 having a predetermined pitch P2 are formed between the plurality of third recessed holes 69.

In addition, in the fitting groove 63 on the one end portion side in the longitudinal direction of the housing 61, a plurality of fourth recessed holes 66 are formed side by side in a direction orthogonal to the plate thickness direction from the bottom portion 63a of the fitting groove 63 so as to correspond to the sensor accommodating portion 67. The fourth recessed holes 66 are bottomed holes each having an opening width W3 in an arrangement direction and formed in a substantially rectangular parallelepiped shape so as to be arranged side by side at predetermined intervals in the bottom portion 63a of the fitting groove 63. Therefore, ribs

62 having a predetermined pitch P3 are formed between the plurality of fourth recessed holes 66.

Here, the opening width W3 in the arrangement direction and a hole depth of the fourth recessed hole 66 are respectively smaller than the opening width W2 in the arrangement direction and a hole depth of the third recessed hole 69. That is, the fourth recessed hole 66 is formed to have an opening width in the arrangement direction narrower than that of the third recessed hole 69 and a hole depth shallower than that of the third recessed hole 69.

By setting the predetermined pitch P3 of the ribs 62 to be the same as the predetermined pitch P2 of the ribs 68, a rib width of the rib 62 is wider than a rib width of the rib 68. The thickness S3 between a bottom portion of the fourth recessed hole 66 and the sensor accommodating portion 67 is thicker than a thickness S2 between a bottom portion of the third recessed hole 69 and the sensor accommodating portion 67. Therefore, a housing portion of the sensor accommodating portion 67 on a fitting groove 63 side is less likely to warp in the plate thickness direction.

As described above, according to the plate 60 for the battery stack according to the present embodiment, in the plate-shaped housing 61 in which the fitting groove 63 for fitting to the side edge portion 42 of the conductive plate 40 is recessed in the first plate side surface, it is possible to reduce a thickness of the housing 61 while ensuring a compressive strength in the plate thickness direction and the apparent plate thickness t by the plurality of bottomed first recessed holes 65 formed side by side in the second plate side surface of the housing 61 and the plurality of second recessed holes 93 formed side by side in the bottom portion 63a of the fitting groove 63 so as to respectively correspond to between the two adjacent first recessed holes 65, 65, thereby preventing molding defects such as sink marks and warpage. In particular, since the second recessed hole 93 is formed at a thick portion between bottom portions of the two adjacent first recessed holes 65, 65 and the bottom portion 63a of the fitting groove 63, it is possible to prevent sink marks at the thick portion where sink marks are likely to occur. Therefore, plate surfaces (front and back surfaces) of the plate 60 for the battery stack, which are stacked surfaces, are flat surfaces without unevenness.

Therefore, in the plate 60 for the battery stack according to the present configuration, which is disposed together with the conductive plate 40 between the plurality of power storage modules 10, when a restraining force is applied thereto by a restraining tool (not shown) for constituting the battery stack 1 that is a substantially rectangular parallelepiped laminated body, it is possible to prevent sandwiched surfaces of the power storage modules 10 from being damaged or prevent the stacked surfaces from being lifted due to inclination.

According to the plate 60 for the battery stack according to the present embodiment, the plate-shaped housing 61 in which the sensor accommodating portion 67 is formed by cutting out so as to penetrate from the third plate side surface in the plate thickness direction includes the plurality of bottomed third recessed holes 69 formed side by side in the second plate side surface so as to correspond to the sensor accommodating portion 67, and the plurality of bottomed fourth recessed holes 66 formed side by side in the bottom portion 63a of the fitting groove 63 so as to correspond to the sensor accommodating portion 67. The third recessed holes 69 and the fourth recessed holes 66 can reduce the thickness while ensuring the compressive strength in the thickness direction and the apparent thickness t in housing portions on both sides of the sensor accommodating portion 67, thereby preventing sink marks. In particular, since the fourth recessed hole 66 is formed between the sensor accommodating portion 67 and the bottom portion 63a of the fitting groove 63, it is possible to prevent warpage in the housing portion of the sensor accommodating portion 67 on the fitting groove 63 side where warpage is likely to occur.

In the plate 60 for the battery stack, one terminal of the electric wire 95 is connected to the battery temperature sensor 90 accommodated in the sensor accommodating portion 67 of the housing 61, and the other terminal of the electric wire 95 is electrically connected to the temperature detection circuit (not shown), so that the temperature of the power storage module 10 can be detected.

Figure 6:
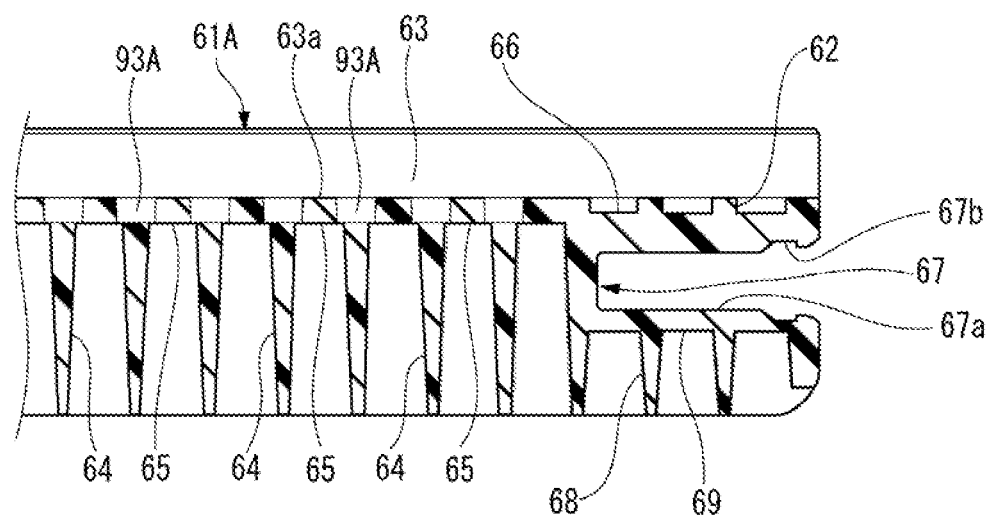
FIG. 6 is an enlarged sectional view of a main part of a housing according to a modification of the housing shown in FIG. 5.

FIG. 6 is an enlarged sectional view of a main part of a housing 61A according to a modification of the housing 61 shown in FIG. 5. In the housing 61A according to the modification, components the same as those of the housing 61 described above are denoted by the same reference numerals, and detailed description thereof will be omitted.

As shown in FIG. 6, in the housing 61A according to the modification, a plurality of second recessed holes 93A are formed instead of the plurality of bottomed second recessed holes 93 of the housing 61 described above. That is, the plurality of second recessed holes 93A are formed side by side in a direction (downward direction in FIG. 6) orthogonal to a plate thickness direction from the bottom portion 63a of the fitting groove 63 in the bottom portion 63a of the fitting groove 63 respectively corresponding to between the two adjacent first recessed holes 65, 65, and communicate with the first recessed holes 65.

That is, the second recessed hole according to the present disclosure can adopt various configurations such as the second recessed hole 93A communicating with the first recessed hole 65, the bottomed second recessed hole 93, and the like according to a hole depth necessary for preventing sink marks in the thick portion.

Figure 7:
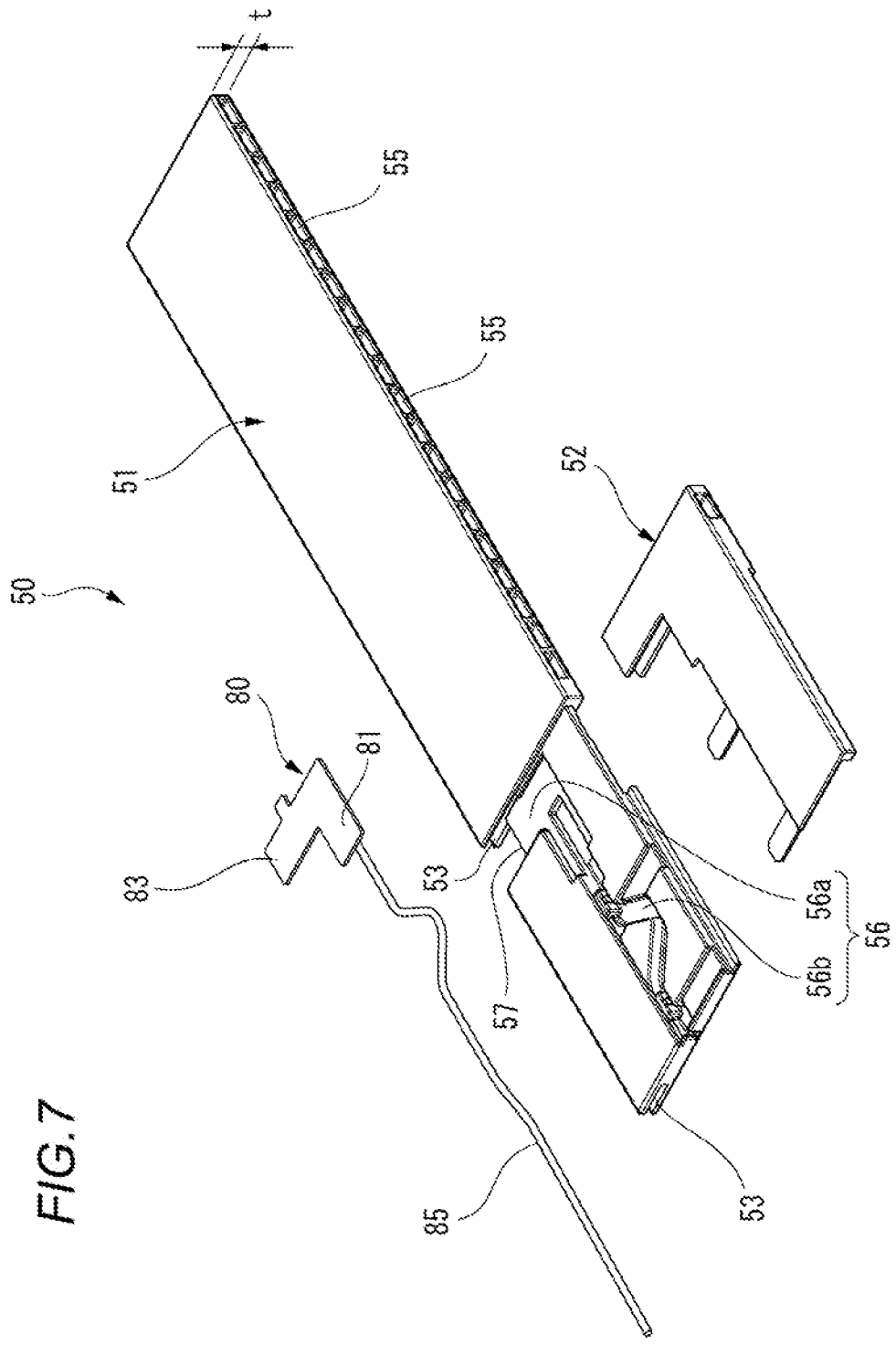
FIG. 7 is an exploded perspective view of a plate for the battery stack including a connection terminal shown in FIG. 2A.
Figure 8:
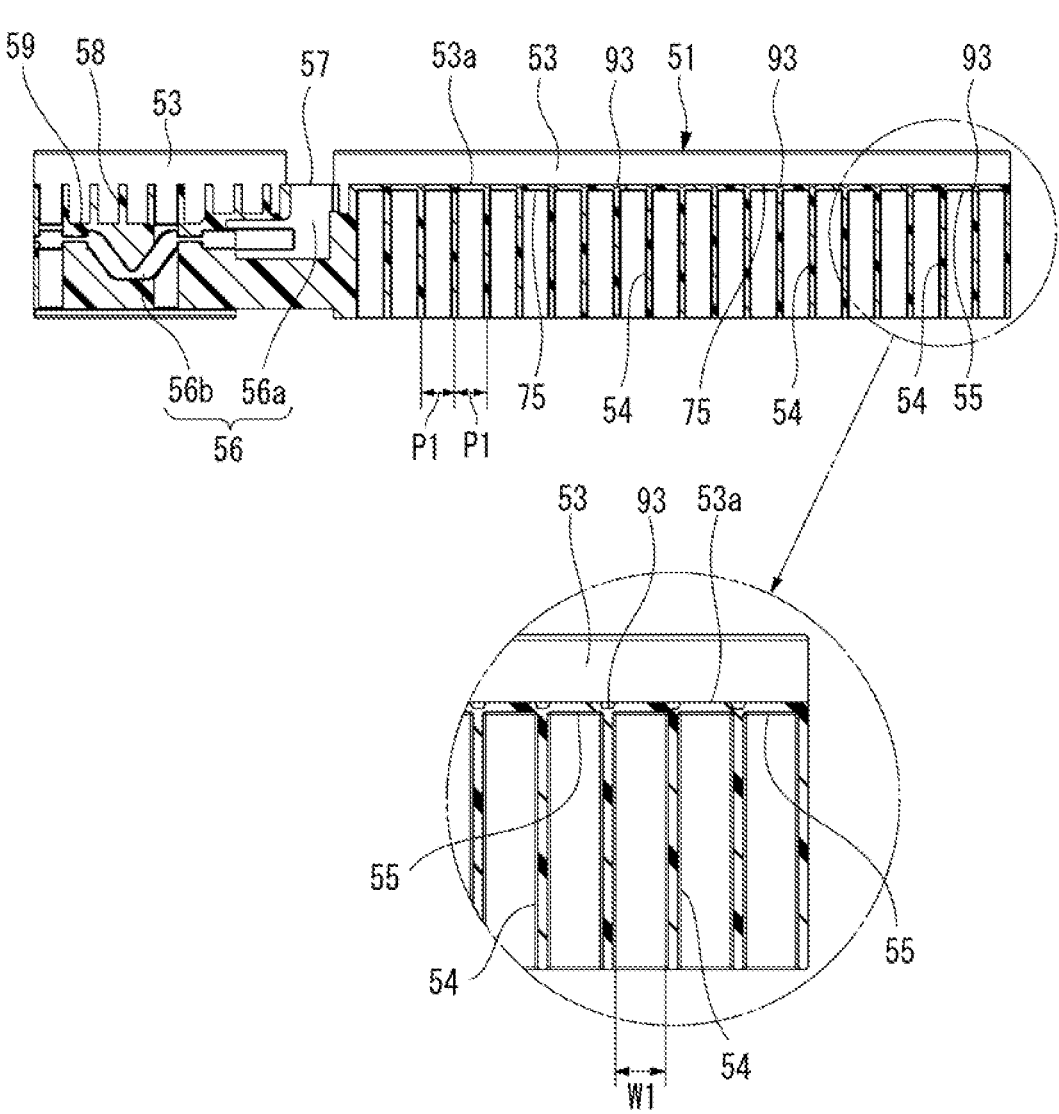
FIG. 8 is a horizontal sectional view and an enlarged view of a main part of a housing shown in FIG. 7.

FIG. 7 is an exploded perspective view of the plate 50 for the battery stack including a connection terminal 80 shown in FIG. 2A. FIG. 8 is a horizontal sectional view and an enlarged view of a main part of a housing 51 shown in FIG. 7.

As shown in FIG. 7, the plate 50 for the battery stack according to the present embodiment is configured to include the elongated rectangular plate-shaped housing 51, the connection terminal 80, an electric wire 85 whose one terminal is connected to the connection terminal 80, and an insulating cover 52.

The connection terminal 80 is made of a conductive metal material such as copper or a copper alloy, and is formed in an L-shaped plate shape. The connection terminal 80 has an electric wire connection portion 81 at one end of an L shape and an electrical connection portion 83 at the other end of the L shape.

The electric wire connection portion 81 is electrically connected to the one terminal of the electric wire 85 by welding or the like. The other terminal of the electric wire 85 is electrically connected to a temperature detection circuit (not shown) via a connector or the like. The electrical connection portion 83 is electrically connected to the side edge portion 42 of the conductive plate 40 by welding or the like.

The housing 51 is formed by injection molding of an insulating resin material into an elongated rectangular plate shape having the predetermined plate thickness t.

As shown in FIG. 8, the fitting groove 53 for fitting to the side edge portion 42 of the conductive plate 40 is recessed in one plate side surface along a longitudinal direction, which is a first plate side surface of the housing 51. A surface of a plate surface of the housing 51 in which the fitting groove 53 is fitted to the side edge portion 42 of the conductive plate 40 is configured to be flush with a surface of a plate surface of the conductive plate 40.

As shown in FIG. 7, an accommodating recess 56 for accommodating the one terminal of the electric wire 85 and the connection terminal 80 is provided on one plate surface (upper surface in FIG. 7) on one end portion side in the longitudinal direction of the housing 51.

The accommodating recess 56 includes a terminal accommodating portion 56a that accommodates the connection terminal 80 and an electric wire accommodating portion 56b that accommodates the one terminal of the electric wire 85.

The terminal accommodating portion 56a is provided with a cutout portion 57 for bringing the electrical connection portion 83 of the connection terminal 80 into contact with the side edge portion 42 of the conductive plate 40 fitted into the fitting groove 53. Therefore, when the connection terminal 80 is accommodated in the terminal accommodating portion 56a, the electrical connection portion 83 comes into contact with the side edge portion 42 of the conductive plate 40, and welding work is facilitated.

Since the one terminal of the electric wire 85 bent in a V shape is accommodated in the electric wire accommodating portion 56b, when a tensile force acts on the other terminal of the electric wire 85, it is possible to prevent the tensile force from acting on a connection portion with the electric wire connection portion 81.

Further, as shown in FIGS. 7 and 8, on the other plate side surface (lower plate side surface in FIG. 8) along the longitudinal direction, which is a second plate side surface of the housing 51 opposite to the first plate side surface, a plurality of first recessed holes 55 are formed side by side in a direction (upward direction in FIG. 8) orthogonal to a plate thickness direction from the second plate side surface. The plurality of first recessed holes 55 are bottomed holes each having the opening width W1 in an arrangement direction and formed in a substantially rectangular parallelepiped shape so as to be arranged side by side at predetermined intervals on the second plate side surface. Therefore, ribs 54 having a predetermined pitch P1 are formed between the plurality of first recessed holes 55.

Further, as shown in FIG. 8, in a bottom portion 53a of the fitting groove 53 respectively corresponding to between the two adjacent first recessed holes 55, 55, the plurality of bottomed second recessed holes 93 are formed side by side in a direction (downward direction in FIG. 8) orthogonal to the plate thickness direction from the bottom portion 53a of the fitting groove 53.

As shown in FIG. 8, a plurality of recessed holes 59 are formed in the bottom portion 53a on one end portion side (left end side in FIG. 8) in a longitudinal direction of the fitting groove 53 so as to be arranged side by side in a direction (downward direction in FIG. 5) orthogonal to the plate thickness direction. The plurality of recessed holes 59 are bottomed holes formed in a substantially rectangular parallelepiped shape so as to be arranged side by side at predetermined intervals in the bottom portion 53a of the fitting groove 53 recessed in the first plate side surface. Therefore, ribs 58 are formed between the plurality of recessed holes 59.

As shown in FIG. 7, the insulating cover 52 formed by injection molding of an insulating resin material is attached so as to sandwich the housing 51 from the plate thickness direction in order to cover the one terminal of the electric wire 85 and the connection terminal 80 accommodated in the accommodating recess 56. The insulating cover 52 covers the accommodating recess 56 so as to be flush with the surface of the plate surface of the housing 51.

The insulating cover 52 is attached to the housing 51 so as to be movable between a temporarily locked position and a fully locked position with respect to the housing 51. The insulating cover 52 at the temporarily locked position expose without covering the electrical connection portion 83 of the connection terminal 80 accommodated in the accommodating recess 56. The insulating cover 52 at the fully locked position completely covers the connection terminal 80 accommodated in the accommodating recess 56.

As described above, according to the plate 50 for the battery stack according to the present embodiment, in the plate-shaped housing 51 in which the fitting groove 53 for fitting to the side edge portion 42 of the conductive plate 40 is recessed in the first plate side surface, it is possible to reduce a thickness of the housing 51 while ensuring a compressive strength in the plate thickness direction and the apparent plate thickness t by the plurality of bottomed first recessed holes 55 formed side by side in the second plate side surface of the housing 51 and the plurality of second recessed holes 93 formed side by side in the bottom portion 53a of the fitting groove 53 so as to respectively correspond to between the two adjacent first recessed holes 55, 55, thereby preventing molding defects such as sink marks and warpage. In particular, since the second recessed hole 93 is formed at a thick portion between bottom portions of the two adjacent first recessed holes 55, 55 and the bottom portion 53a of the fitting groove 53, it is possible to prevent sink marks at the thick portion where sink marks are likely to occur. Therefore, plate surfaces (front and back surfaces) of the plate 50 for the battery stack, which are stacked surfaces, are flat surfaces without unevenness.

The plate 50 for the battery stack can detect a voltage of the power storage module 10 by electrically connecting the one terminal of the electric wire 85 accommodated in the accommodating recess 56 of the housing 51 to the connection terminal 80 electrically connected to the side edge portion 42 of the conductive plate 40 and electrically connecting the other terminal of the electric wire 85 to a voltage detection circuit (not shown). Since the insulating cover 52 covers the accommodating recess 56 so as to be flush with the surface of the plate surface of the housing 51, the plate surfaces (front and back surfaces) of the plate 50 for the battery stack, which are the stacked surfaces, are flat surfaces without unevenness.

Therefore, in the plate 50 for the battery stack according to the present embodiment, which is disposed together with the conductive plate 40 between the plurality of power storage modules 10, when a restraining force is applied thereto by a restraining tool (not shown) for constituting the battery stack 1 that is a stacked body having a substantially rectangular parallelepiped shape, it is possible to prevent sandwiched surfaces of the power storage modules 10 from being damaged or prevent the plate surfaces of the plate 50 for the battery stack from being lifted due to inclination, and it is possible to detect the voltage of the power storage module 10.

Figure 9:
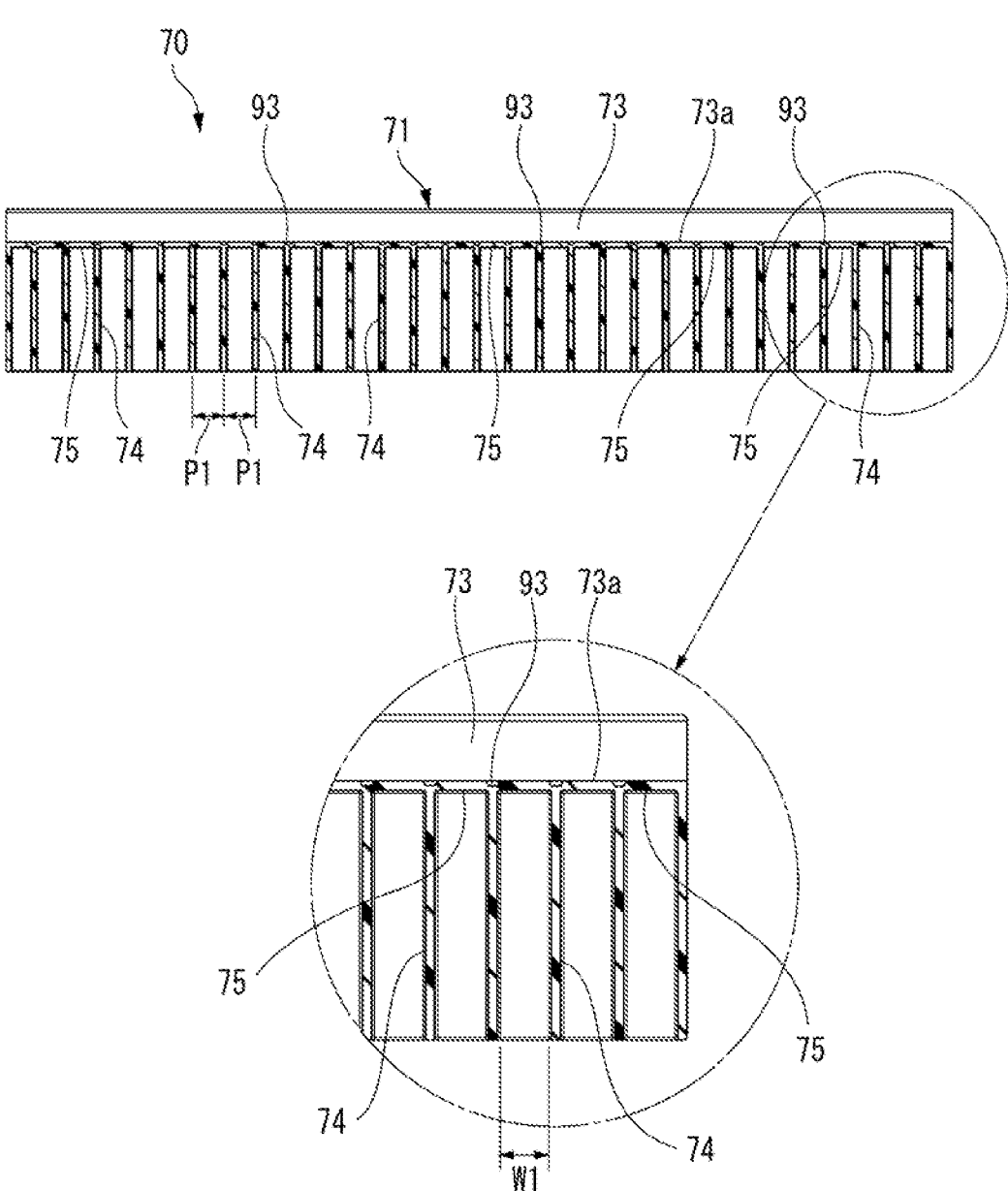
FIG. 9 is a horizontal sectional view of a housing of a dummy plate for the battery stack shown in FIG. 2B.

FIG. 9 is a horizontal sectional view and an enlarged view of a main part of a housing 71 of the dummy plate 70 for the battery stack shown in FIG. 2B.

As shown in FIG. 9, the plate 70 for the battery stack according to the present embodiment is configured to include the elongated rectangular plate-shaped housing 71. The plate 70 for the battery stack is a dummy plate that is interposed between plate surfaces of the adjacent power storage modules 10 so as to maintain an interval between the power storage modules 10 at a predetermined interval, and is not provided with functional components such as the connection terminal 80 and the battery temperature sensor 90.

The housing 71 is formed by injection molding of an insulating resin material into an elongated rectangular plate shape having the predetermined plate thickness t.

As shown in FIGS. 2B and 9, the fitting groove 73 for fitting to the side edge portion 42 of the conductive plate 40 is recessed in one plate side surface along a longitudinal direction, which is a first plate side surface of the housing 71. A surface of a plate surface of the housing 71 in which the fitting groove 73 is fitted to the side edge portion 42 of the conductive plate 40 is configured to be flush with a surface of a plate surface of the conductive plate 40.

As shown in FIG. 9, on the other plate side surface (lower plate side surface in FIG. 9) along the longitudinal direction, which is a second plate side surface of the housing 71 opposite to the first plate side surface, a plurality of first recessed holes 75 are formed side by side in a direction (upward direction in FIG. 9) orthogonal to a plate thickness direction from the second plate side surface. The plurality of first recessed holes 75 are bottomed holes each having the opening width W1 and formed in a substantially rectangular parallelepiped shape so as to be arranged side by side at predetermined intervals on the second plate side surface. Therefore, ribs 74 having a predetermined pitch P1 are formed between the plurality of first recessed holes 75.

Further, as shown in FIG. 9, in a bottom portion 73a of the fitting groove 73 respectively corresponding to between the two adjacent first recessed holes 75, 75, the plurality of bottomed second recessed holes 93 are formed side by side in a direction (downward direction in FIG. 9) orthogonal to the plate thickness direction from the bottom portion 73a of the fitting groove 73.

As described above, according to the plate 70 for the battery stack according to the present embodiment, in the plate-shaped housing 71 in which the fitting groove 73 for fitting to the side edge portion 42 of the conductive plate 40 is recessed in the first plate side surface, it is possible to reduce a thickness of the housing 71 while ensuring a compressive strength in the plate thickness direction and the apparent plate thickness t by the plurality of bottomed first recessed holes 75 formed side by side in the second plate side surface of the housing 71 and the plurality of second recessed holes 93 formed side by side in the bottom portion 73a of the fitting groove 73 so as to respectively correspond to between the two adjacent first recessed holes 75, 75, thereby preventing molding defects such as sink marks and warpage. In particular, since the second recessed hole 93 is formed at a thick portion between bottom portions of the two adjacent first recessed holes 75, 75 and the bottom portion 73a of the fitting groove 73, it is possible to prevent sink marks at the thick portion where sink marks are likely to occur. Therefore, plate surfaces (front and back surfaces) of the plate 70 for the battery stack, which are stacked surfaces, are flat surfaces without unevenness.

Therefore, in the plate 70 for the battery stack according to the present embodiment, which is disposed together with the conductive plate 40 between the plurality of power storage modules 10, when a restraining force is applied thereto by a restraining tool (not shown) for constituting the battery stack 1 that is a stacked body having a substantially rectangular parallelepiped shape, it is possible to prevent sandwiched surfaces of the power storage modules 10 from being damaged or prevent the plate surfaces of the plate 70 for the battery stack from being lifted due to inclination.

Then, as shown in FIG. 1, the two first plate-shaped members 20 each including the plate 50 for the battery stack and the plate 60 for the battery stack respectively fitted to both side edge portions 42 of the conductive plate 40, and the second plate-shaped member 30 including the plate 50 for the battery stack and the plate 70 for the battery stack respectively fitted to both side edge portions 42 of the conductive plate 40 are respectively disposed between the four power storage modules 10 to form the battery stack 1.

Therefore, according to the battery stack 1 according to the present embodiment, the first and second plate-shaped members 20, 30 respectively disposed between the four stacked power storage modules 10 are constituted by the conductive plate 40 electrically connecting the adjacent power storage modules 10 to each other, and the plates 50, 60, 70 for the battery stack appropriately fitted to the side edge portions 42 of the conductive plate 40, respectively.

Therefore, in the battery stack 1 according to the present configuration, when a restraining force is applied thereto by a restraining tool (not shown), it is possible to prevent the sandwiched surfaces of the power storage modules 10 from being damaged or prevent the plate surfaces of the plates 50, 60, 70 for the battery stack from being lifted due to inclination.

Figure 10:
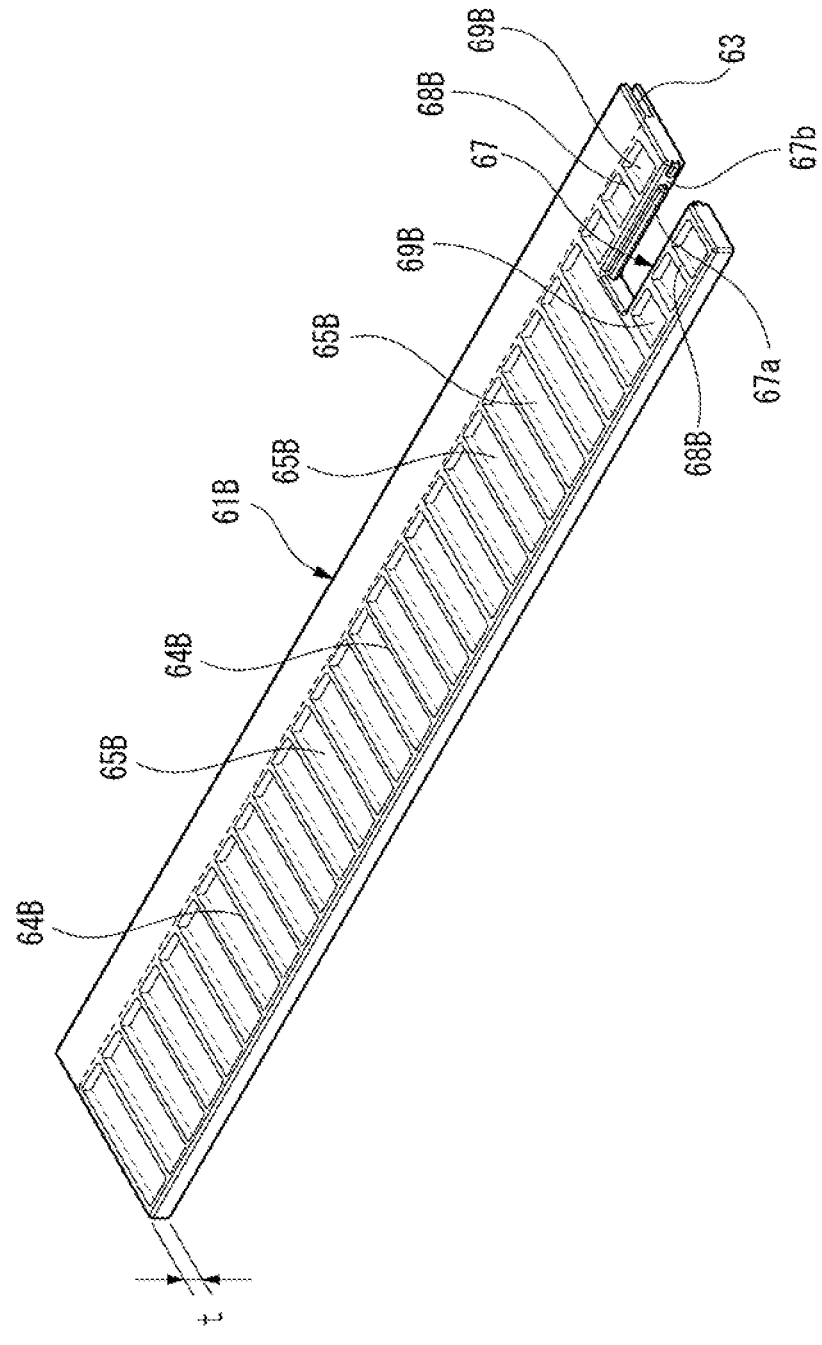
FIG. 10 is a perspective view of a housing for a battery stack according to a reference example.

FIG. 10 is a perspective view of a housing 61B for a battery stack according to a reference example. Components of the housing 61B the same as those of the housing 61 described above are denoted by the same reference numerals, and detailed description thereof will be omitted.

As shown in FIG. 10, the housing 61B according to the reference example is formed by injection molding of an insulating resin material into an elongated rectangular plate shape having the predetermined plate thickness t.

The fitting groove 63 for fitting to the side edge portion 42 of the conductive plate 40 is recessed in one plate side surface along a longitudinal direction, which is a first plate side surface of the housing 61B.

On one plate surface (upper surface in FIG. 10) of the housing 61B, a plurality of recessed portions 65B, 69B are provided at predetermined intervals along the longitudinal direction. The plurality of recessed portions 65B, 69B are bottomed holes having rectangular openings. Therefore, ribs 64B having a predetermined pitch are formed between the plurality of recessed portions 65B, and ribs 68B having a predetermined pitch are formed between the plurality of recessed portions 698. Here, the recessed portions may be referred to as thickness reduction portions.

In this way, by providing the plurality of recessed portions 65B, 69B on the plate surface of the flat plate-shaped housing 61B, it is possible to reduce a thickness of the housing 61B while ensuring a compressive strength in a plate thickness direction and the apparent plate thickness t, and to prevent molding defects such as sink marks and warpage.

However, in a case where the plurality of recessed portions 65B, 69B are provided on the plate surface of the housing 61B that is a stacked surface, unevenness formed by the plurality of recessed portions 65B, 69B and the ribs 64B, 68B are formed on the plate surface of the housing 61B as shown in FIG. 10. Therefore, in the housing 61B for the battery stack in which the plurality of recessed portions 65B, 69B are provided, when a restraining force is applied thereto by a restraining tool (not shown) for constituting a stacked body, sandwiched surfaces of the power storage modules 10 may be damaged or the plate surfaces of the housing 61B may be lifted due to inclination.

As described above, according to the present disclosure, it is possible to provide the plates 50, 60, 70 for the battery stack, which can be favorably sandwiched between the plurality of stacked power storage modules 10, and the battery stack 1.

It should be noted that the present disclosure is not limited to the embodiment described above, and modifications, improvements, and the like can be made as appropriate. In addition, materials, shapes, dimensions, numbers, arrangement positions, and the like of components in the embodiment described above are optional and are not limited as long as the invention can be achieved.

According to a first illustrative aspect of the present disclosure, a plate (50, 60, 70) for a battery stack configured to be sandwiched between a plurality of power storage modules (10), includes: a plate-shaped housing (51, 61, 71) having a fitting groove (53, 63, 73) provided in a recessed shape in a first plate side surface of the plate for the battery stack along a longitudinal direction thereof, the fitting groove (53, 63, 73) being a groove configured to fit with a side edge portion (42) of a conductive plate (40) disposed between the plurality of stacked power storage modules (10); a plurality of bottomed first recessed holes (55, 65, 75) formed side by side in a direction orthogonal to a plate thickness direction of the plate for the battery stack, and extending from a second plate side surface opposite to the first plate side surface; and a plurality of second recessed holes (93) formed side by side in the direction orthogonal to the plate thickness direction, and extending from a bottom portion (53*a*, 63*a*, 73*a*) of the fitting groove (53, 63, 73) to be positioned between the two adjacent first recessed holes (55, 65, 75).

According to the plate for the battery stack of the first aspect, in the plate-shaped housing in which the fitting groove for fitting to the side edge portion of the conductive plate is recessed in the first plate side surface, it is possible to reduce a thickness while ensuring a compressive strength in the plate thickness direction and an apparent plate thickness by the plurality of bottomed first recessed holes formed side by side in the second plate side surface of the housing and the plurality of second recessed holes formed side by side in the bottom portion of the fitting groove so as to respectively correspond to between the two adjacent first recessed holes, thereby preventing molding defects such as sink marks and warpage. In particular, since the second recessed hole is formed at a thick portion between bottom portions of the two adjacent first recessed holes and the bottom portion of the fitting groove, it is possible to prevent sink marks in the thick portion where sink marks are likely to occur. Therefore, plate surfaces (front and back surfaces) of the plate for the battery stack, which are stacked surfaces, are flat surfaces without unevenness.

Therefore, in the plate for the battery stack according to the present configuration, which is disposed together with the conductive plate between the plurality of power storage modules, when a restraining force is applied thereto by a restraining tool for constituting the battery stack that is a substantially rectangular parallelepiped stacked body, it is possible to prevent sandwiched surfaces of the power storage modules from being damaged or prevent the stacked surfaces from being lifted due to inclination.

According to a second illustrative aspect of the present disclosure, the plate (60) for the battery stack may further include: a recess (67) formed to penetrate in the plate thickness direction, and extending from a third plate side surface intersecting with the first plate side surface; a plurality of bottomed third recessed holes (69) formed side by side in the direction orthogonal to the plate thickness direction, and extending from the second plate side surface in a corresponding position to the recess (67); and a plurality of bottomed fourth recessed holes (66) formed side by side in the direction orthogonal to the plate thickness direction, and extending from the bottom portion (63*a*) of the fitting groove (63) in the corresponding position to the recess (67). An opening width (W3) in a direction in which the fourth recessed holes (66) are arranged may be narrower than an opening width (W2) in a direction in which the third recessed holes (69) are arranged, and a hole depth of the fourth recessed holes (66) may be shallower than a hole depth of the third recessed holes (69).

According to the plate for the battery stack of the second aspect, the plate-shaped housing in which the recess is formed by cutting out so as to penetrate from the third plate side surface in the plate thickness direction includes the plurality of bottomed third recessed holes formed side by side in the second plate side surface so as to correspond to the recess, and the plurality of bottomed fourth recessed holes formed side by side in the bottom portion of the fitting groove so as to correspond to the recess. The third recessed holes and the fourth recessed holes can reduce the thickness while ensuring the compressive strength in the plate thickness direction and the apparent plate thickness in housing portions on both sides of the recess, thereby preventing sink marks. In particular, since the fourth recessed hole is formed between the recess and the bottom portion of the fitting groove, it is possible to prevent warpage in the housing portion on a fitting groove side of the recessed portion where warpage is likely to occur.

According to a third illustrative aspect of the present disclosure, the plate (60) for the battery stack may further include: a battery temperature sensor (90) accommodated in the recess (67); and an electric wire (95) having one terminal connected to the battery temperature sensor (90).

According to the plate for the battery stack of the third aspect, the one terminal of the electric wire is connected to the battery temperature sensor accommodated in the recess of the housing, and the other terminal of the electric wire is electrically connected to a temperature detection circuit, so that a temperature of the power storage module can be detected. Since the battery temperature sensor accommodated in the recess of the housing is accommodated flush with a surface of a plate surface of the housing, plate surfaces (front and back surfaces) of the plate for the battery stack, which are stacked surfaces, are flat surfaces without unevenness.

Therefore, in the plate for the battery stack according to the present configuration, which is disposed together with the conductive plate between the plurality of power storage modules, when a restraining force is applied thereto by a restraining tool for constituting the battery stack that is a substantially rectangular parallelepiped stacked body, it is possible to prevent sandwiched surfaces of the power storage modules from being damaged or prevent the stacked surfaces from being lifted due to inclination, and it is possible to detect the temperature of the power storage module.

According to a fourth illustrative aspect of the present disclosure, a battery stack (1) may include the plate (50, 60, 70) for the battery stack according to any one of the first to third aspects.

According to the battery stack of the fourth aspect, each of the plate-shaped members disposed between the plurality of stacked power storage modules includes the conductive plate that electrically connects the adjacent power storage modules to each other, and the plate for the battery stack that is appropriately fitted to each side edge portion of the conductive plate.

Therefore, in the battery stack according to the present configuration, which is disposed together with the conductive plate between the plurality of power storage modules, when a restraining force is applied thereto by a restraining tool, it is possible to prevent sandwiched surfaces of the power storage modules from being damaged or the plate surfaces of the plate for the battery stack from being lifted due to inclination.

According to the present disclosure, it is possible to provide a plate for a battery stack, which can be favorably sandwiched between a plurality of stacked power storage modules, and a battery stack.

What is claimed is:

1. A plate for a battery stack configured to be sandwiched between a plurality of power storage modules, comprising:

a plate-shaped housing having a fitting groove provided in a recessed shape in a first plate side surface of the plate for the battery stack along a longitudinal direction thereof, the fitting groove being a groove configured to fit with a side edge portion of a conductive plate disposed between the plurality of stacked storage modules;

a plurality of bottomed first recessed holes formed side by side in a direction orthogonal to a plate thickness direction of the plate for the battery stack, and extending from a second plate side surface opposite to the first plate side surface; and a plurality of second recessed holes formed side by side in the direction orthogonal to the plate thickness direction, and extending from a bottom portion of the fitting groove to be positioned between the two adjacent first recessed holes, wherein the plurality of second recessed holes physically communicate with the plurality of bottomed first recessed holes.

2. The plate for the battery stack according to claim 1, further comprising:

a recess formed to penetrate in the plate thickness direction, and extending from a third plate side surface intersecting with the first plate side surface;

a plurality of bottomed third recessed holes formed side by side in the direction orthogonal to the plate thickness direction, and extending from the second plate side surface in a corresponding position to the recess; and a plurality of bottomed fourth recessed holes formed side by side in the direction orthogonal to the plate thickness direction, and extending from the bottom portion of the fitting groove in the corresponding position to the recess, wherein an opening width in a direction in which the fourth recessed holes are arranged is narrower than an opening width in a direction in which the third recessed holes are arranged, and a hole depth of the fourth recessed holes is shallower than a hole depth of the third recessed holes.

3. The plate for the battery stack according to claim 2, further comprising:

a battery temperature sensor accommodated in the recess; and an electric wire having one terminal connected to the battery temperature sensor.

4. A battery stack comprising:

the plate for the battery stack according to claim 1.

* * * * *